(12) United States Patent
Fujita

(10) Patent No.: US 6,922,072 B2
(45) Date of Patent: Jul. 26, 2005

(54) SIGNAL CROSSTALK INHIBITION UNIT AND A SIGNAL PROCESSING APPARATUS

(75) Inventor: Hironobu Fujita, Takefu (JP)

(73) Assignee: Orion Electric Co., Ltd., Fukui-ken (JP)

( * ) Notice: Subject to any disclaimer, the term of this patent is extended or adjusted under 35 U.S.C. 154(b) by 109 days.

(21) Appl. No.: 10/603,717

(22) Filed: Jun. 26, 2003

(65) Prior Publication Data

US 2004/0041645 A1 Mar. 4, 2004

(30) Foreign Application Priority Data

Jun. 26, 2002 (JP) ........................................ 2002-186288

(51) Int. Cl.$^7$ ............................................. H03K 17/16
(52) U.S. Cl. ............................ 326/27; 326/30; 333/12
(58) Field of Search ............................... 326/26, 27, 30, 326/82, 83; 333/101, 12, 238, 258, 32

(56) References Cited

U.S. PATENT DOCUMENTS

| | | | | |
|---|---|---|---|---|
| 3,946,251 A | * | 3/1976 | Kawagoe | 327/328 |
| 5,166,561 A | * | 11/1992 | Okura | 327/312 |
| 5,218,242 A | * | 6/1993 | Imazu et al. | 326/30 |
| 5,933,021 A | * | 8/1999 | Mohd | 326/30 |

FOREIGN PATENT DOCUMENTS

| | | |
|---|---|---|
| JP | 05-300056 | 4/1992 |
| JP | 06-338775 | 5/1993 |
| JP | 08-056146 | 8/1994 |
| JP | 08-186481 | 12/1994 |
| JP | 09-284663 | 4/1996 |
| JP | 2002-057417 | 8/2000 |

* cited by examiner

*Primary Examiner*—Don Le
(74) *Attorney, Agent, or Firm*—Reed Smith LLP; Stanley P. Fisher, Esq.; Juan Carlos A. Marquez, Esq.

(57) ABSTRACT

A crosstalk inhibition unit which can inhibit crosstalk without causing an enlargement of a signal processing apparatus.

A crosstalk inhibition unit 10 in order to inhibit crosstalk is provided to a signal processing apparatus. The crosstalk inhibition unit 10 is comprised of a contact terminal detection means 8 for detecting whether a contact terminal 7b of a signal cable 7 is inserted to an external terminal 5b of the signal processing apparatus and a first switching element 2 which operates differently depending on whether the contact terminal detection means 8 detects the contact terminal 7b.

When the contact terminal detection means 8 does not detect the contact terminal 8, the first switching element 2 becomes conductive, and a signal line 15b is grounded. Thus, the cable 7 is not connected, and a signal line 15b, which is not used for signal processing is grounded. Accordingly, without particularly providing a grounded line, crosstalk between signal lines 15a, 16 and 19 can be inhibited.

11 Claims, 1 Drawing Sheet

SIGNAL CROSSTALK INHIBITION UNIT AND A SIGNAL PROCESSING APPARATUS

BACKGROUND OF THE INVENTION

1. Field of the Invention

The present invention relates to a crosstalk inhibition unit and a signal processing apparatus.

2. Prior Art

In an apparatus such as TV, VTR or the like which processes videos or audios, a plurality of signals are processed. And a plurality of signal lines for transmitting several kinds of signals are disposed in a signal processing apparatus which processes signals of videos, audios or the like.

These signal lines are disposed in parallel with each other to be efficiently disposed in a limited close space of an apparatus. With the signal lines disposed in parallel with each other, signal crosstalk between signals transmitted in those signal lines can be easily induced.

If grounded lines are properly disposed along the signal lines, the effect by the signals transmitted in different signal lines can be shielded by such grounded lines, and crosstalk between the signal lines can be prevented. However, disposing the grounded lines along the signal lines requires a space for it and introduces an enlargement of an apparatus, and this is not preferable.

SUMMARY OF THE INVENTION

It is therefore an object of the present invention to provide a crosstalk inhibition unit, which can inhibit crosstalk without causing an enlargement of a signal processing apparatus, and a signal processing apparatus.

In order to solve the above problems, the present invention provides a signal crosstalk inhibition unit provided to a signal processing apparatus having a plurality of external terminals and signal lines connected to said external terminals, by connecting a signal cable to said signal processing apparatus with inserting a connection terminal of said signal cable into an external terminal, signal being inputted into a signal line and/or outputting signal from said signal line;

said signal crosstalk inhibition unit having a first switching element provided between said signal line and the ground, and a connection terminal detection means for detecting whether said connection terminal of said signal cable is connected to said external terminal of said signal processing apparatus or not, and said signal crosstalk inhibition unit making said first switching element into conductive state to connect said signal line to the ground, when said connection terminal detection means does not detect said connection terminal of said signal cable, and said signal crosstalk inhibition unit making said first switching element into unconductive state when said connection terminal detection means detects said connection terminal of said signal cable. The crosstalk inhibition unit according to the present invention detects whether a connection terminal of a signal cable is inserted into an external terminal of a signal processing apparatus to which the present crosstalk inhibition unit is provided, i.e., whether a signal cable is connected or not.

When it is detected that the connection terminal of the signal cable is not inserted into the external terminal of the signal processing apparatus, the first switching element is made into conductive state, and a signal line connected to an external terminal, in which a connection terminal was not detected, is grounded. Thus, by getting a signal line not working to carry on a signal processing grounded, crosstalk between other signal lines in which signal processing are carried out can be prevented.

On the other hand, when it is detected that the connection terminal of the signal cable is inserted into the external terminal of the signal processing apparatus to which a crosstalk inhibition unit is provided, the first switching element is made into unconductive state, so that a signal line on which a connection terminal is detected can implement a signal processing.

Thus, according to the signal crosstalk inhibition unit in the present invention, it detects an external terminal which is not used for a signal processing and gets the signal line corresponding to the detected external terminal grounded, and crosstalk between other signal lines can be prevented. Accordingly, crosstalk can be prevented without particularly providing grounded signal lines to a signal processing apparatus.

Furthermore, in the crosstalk inhibition unit according to the present invention, the first switching element may be constituted of: a first semiconductor switching element as the first switching element, an input terminal of the first semiconductor switching element being connected to the signal line and an output terminal of the first semiconductor switching element being grounded, the distance between the input terminal and the output terminal being conductive in case of a control terminal being applied by a control voltage and unconductive in case of a control terminal being not applied by a control voltage; and a second switching element having one terminal and other terminal, the one terminal being connected so that a control voltage for the first semiconductor switching element is applied and the other terminal being grounded;

wherein the distance between the one terminal and the other terminal of the second switching element becomes conductive when the contact terminal detection means detects a contact terminal of the signal cable, and the distance between the one terminal and the other terminal of the second switching element becomes unconductive when the contact terminal detection means does not detect a contact terminal of the signal cable, and wherein the second switching element becomes conductive when the contact terminal detection means detects a contact terminal of the signal cable, and the first semiconductor switching element becomes unconductive when the control voltage is grounded, and wherein the second switching element becomes unconductive and the first semiconductor switching element becomes conductive when the contact terminal detection means does not detect a contact terminal of the signal cable.

Since the present crosstalk inhibition unit comprises a semiconductor element as a first switching element, the crosstalk inhibition unit can be constituted compactly.

Further, whether the first semiconductor switching element becomes conductive or unconductive depends on whether the second switching element becomes conductive or unconductive in response to the detection result of the connection terminal conducted by the connection terminal detection means.

In addition, the connection terminal detection means may be constituted such that:

whether or not the connection terminal of the signal cable is inserted to the external terminal of the signal processing apparatus is detected by a position of a detection element which is displaced physically between a first position and a second position, and wherein the second switching element becomes unconductive in case the connection terminal of the signal cable is not inserted to the external terminal of the signal processing apparatus and the detection element is placed at the first position, and wherein the second switching element becomes conductive in case the connection terminal of the signal cable is inserted to the external terminal of the signal processing apparatus and the detection element is placed at the second position.

According to the crosstalk inhibition unit in the present invention, whether the connection terminal of the signal cable is inserted to the external terminal of the signal processing apparatus or not is detected by the detection element which is displaced physically, the crosstalk inhibition unit according to the present invention can be constituted simply.

A signal processing apparatus provided with the above explained crosstalk inhibition unit detects an external terminal not used for signal processing, and a detected signal line is grounded, thereby preventing crosstalk between other signal lines. Thus, there is no need to provide a special grounded line in order to prevent crosstalk, thereby leading to a compact signal processing apparatus.

Furthermore, according to the signal processing apparatus that the signal crosstalk inhibition units are disposed for a plurality of the external terminals and the signal lines connected to the external line, the signal lines not used for signal processing can be grounded. Thus, crosstalk can be surely inhibited.

DETAILED DESCRIPTION OF THE PREFERRED EMBODIMENTS

Figure 1:
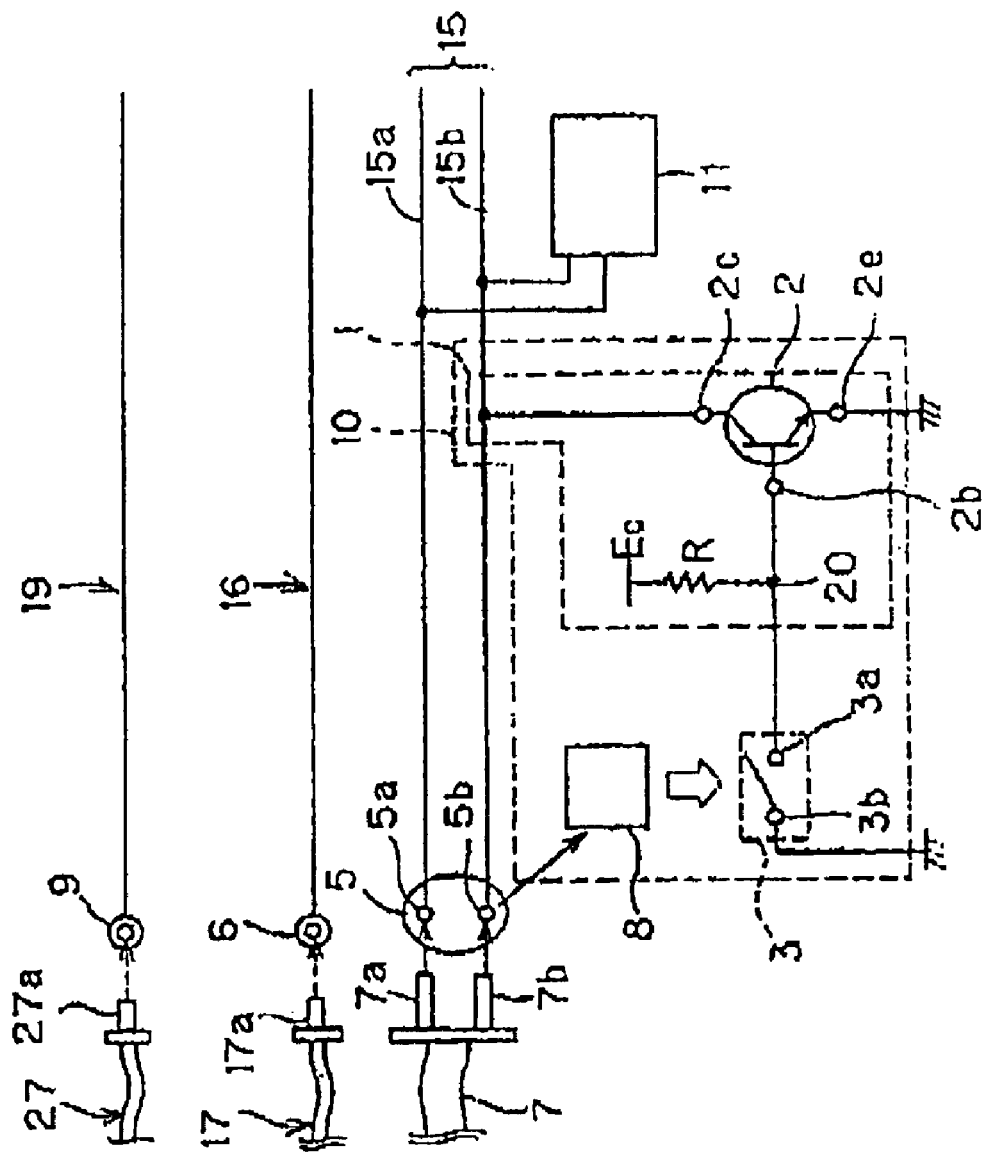
FIG. 1 is a circuit diagram showing a signal processing apparatus provided with a crosstalk inhibition unit according to the present invention.

The invention will now be described in greater detail with reference to the accompanying drawing. One embodiment of a signal processing apparatus provided with a crosstalk inhibition unit according to the present invention is shown in FIG. 1. The drawing shows a circuit diagram of the crosstalk inhibition unit according to the present invention.

The signal processing apparatus shown in FIG. 1 is applied for processing video signals to display video pictures on a TV monitor. The signal processing apparatus in FIG. 1 is provided with external terminals 5, 6, and 9. The external terminal 5 is connected with a signal line 15, the external terminal 6 is connected with a signal line 16, and the external terminal 9 is connected with a signal line 19.

The external terminal 5 is an S signal input terminal to which S video signals are inputted. The external terminal 5 is provided with a terminal 5a to which Y signals (luminance signals) out of S signals are inputted, and a terminal 5b to which C signals (color signals) are inputted.

The external terminal 5a is connected with a signal line 15a, and the external terminal 5b is connected with a signal line 15b. The signal lines 15a and 15b are connected with a Y/C processing circuit 11 as a signal processing circuit. The Y/C processing circuit 11 processes Y signals inputted from the signal line 15a and C signals inputted from the signal line 15b.

A connection terminal 7a at the edge of the signal cable 7 is inserted to the correspondent terminal 5a and a connection terminal 7b at the edge of the signal cable 7 is inserted to the terminal 5b, so that the signal line 7 is connected to the external terminal S. Thus, S video signals transmitted through the signal cable 7 are inputted to the external terminal S and further inputted via the signal line 15 to the Y/C processing circuit 11. The signal cable 7 is comprised of a plurality of cables, i.e., cables for transmitting Y signals and cables for transmitting C signals.

An external terminal 6 shown in FIG. 1 is a composite input terminal for inputting composite signals. The signal line 16 is connected with a certain circuit, not shown, for processing composite signals.

Further, a connection terminal 17a is inserted to the external terminal 6, and the signal cable 17 is connected. Composite signals transmitted through the signal cable 17 are inputted from the external terminal 6 to the signal line 16 and processed.

The signal processing apparatus in FIG. 1 is provided with an external terminal 9 for inputting other signals. The contact terminal 27a is inserted to the external terminal 9, so that the signal cable 27 is connected. Signals transmitted through the signal cable 27 are inputted from the signal line 19 to a certain circuit and processed.

The signal processing apparatus in FIG. 1 is provided with a crosstalk inhibition unit 10. The crosstalk inhibition unit 10 has a first switching circuit 1, a contact terminal detection means 8, and a second switching element 3.

The first switching circuit 1 is connected with a transistor 2 which is a counterpart of a first switching element and a semiconductor switching element. The transistor 2 is provided with a base terminal 2b, an emitter terminal 2b, and a collector terminal 2c.

A collector terminal 2c of the transistor 2 is connected with a signal line 15b. The collector terminal 2c of the transistor 2 is a counterpart of an input terminal. The emitter terminal 2e of the transistor 2 is connected to the ground. The emitter terminal 2e of the transistor 2 is a counterpart of an output terminal.

The base terminal 2b of the transistor 2 is connected to a control voltage supply terminal 20. The control voltage supply terminal 20 is connected via a resistor R with a power supply Ec. A control voltage for controlling the operation of the transistor 2 is supplied from the power supply Ec. The base terminal 2b of the transistor 2 is a terminal to which a control voltage is inputted, and is a counterpart of a control terminal.

When a control voltage outputted from the power supply Ec is applied to the base terminal 2b of the transistor 2, the path between the collector terminal 2c and the emitter terminal 2e of the transistor 2 is made into conductive state. Accordingly, the signal line 15b is connected to the ground and in a grounded state.

On the other hand, when a control voltage outputted from the power supply Ec is not inputted to the base terminal 2b of the transistor 2, the path between the collector terminal 2c and the emitter terminal 2e of the transistor 2 is made into unconductive state. Accordingly, the signal line 15b is not connected to the ground connection and can transmit signals.

The second switching element 3 is constituted of a normal switch that the distance between one terminal 3a and the other terminal 3b of the second switching element 3 is turned ON/OFF by the mechanical contact operation. One terminal 3a of the second switching element 3 is connected to the control voltage supply terminal 20, and the other terminal 3b is connected to the ground.

The second switching element 3 is arranged to be turned ON/OFF in response to the detection of a connection terminal 7b by a connection terminal detection means 8, later explained. When the second switching element 3 is turned ON, the distance between one terminal 3a and the other terminal 3b becomes conductive, and the control voltage supply terminal 20 is grounded and a control voltage is not inputted to the base terminal 2b of the transistor 2.

On the other hand, when the second switching element 3 is turned OFF, the distance between one terminal 3a and the other terminal 3b becomes unconductive, and a control voltage is inputted from the control voltage supply terminal 20 to the base terminal 2b of the transistor 2.

The connection terminal detection means 8 has a detection element which is not shown, and detects whether the connection terminal 7b is inserted to the external terminal 5b or not in response to the position of the detection element.

The detection element provided to the connection terminal detection means 8 is positioned to be located at the first position in the case where the connection terminal 7b is not inserted. When the connection terminal 7b is inserted to the external terminal 5b, the detection element is physically displaced in response to it and positioned to be located at the second position. And the connection terminal 7b is detached from the external terminal 5b after insertion thereto, the detection element is returned to the first position.

And the connection terminal detection means 8 makes the second switching element 3 turn OFF and the distance between the terminals 3a and 3b becomes unconductive in the case where the detection element of it is located at the first position. And the connection terminal detection means 8 makes the second switching element 3 turn ON and the distance between the terminals 3a and 3b becomes conductive in the case where the detection element of it is located at the second position.

Concerning the means for the connection terminal detection means 8 to make the switching element 3 turn ON or OFF depending on whether the connection terminal 7b of the signal cable 7 is inserted or not in the above explanation, a well-known means which is fitted to an S video signal input terminal in the prior art can be adopted.

That is, the means that has a means to detect a connection terminal of signal cable being inserted and that makes a switch turn ON or OFF depending on whether a connection terminal is inserted or not, is well known in the prior art to detect a connection terminal being inserted into the S video signal input terminal.

For arranging the connection terminal detection means 8 and constituting a circuit which makes the second switching element 3 ON or OFF in response to the detection of the contact terminal 7b by the connection terminal detection means 8, the above described well-known art for detecting whether a connection terminal is inserted into an S signal input terminal can be used.

Next, an example of operating the signal processing apparatus above explained will be explained hereunder. In the case where it is not required to process S video signals and is required to process composite signals and other signals transmitted through the signal cable 27 in the signal processing apparatus shown in FIG. 1, the signal cable 17 and signal cable 27 are connected to the signal processing apparatus and the signal cable 7 is not connected.

By connecting the signal cable 17 and the signal cable 27 to the signal processing apparatus, composite signals and other signals sent from the signal cable 27 are inputted to the signal processing apparatus, and a required signal processing is implemented.

Since the signal cable 7 is not connected to the external terminal 5, the contact terminal detection means 8 dose not detect the connection terminal 7b being inserted.

Herewith, a control voltage is applied from the control voltage supply terminal 20 to the transistor 2, and the path between the collector terminal 2c and the emitter terminal 2e becomes conductive. And the signal line 15b is connected, via the transistor 2, to the ground and has a ground potential. Since the signal line 15b is grounded, signal crosstalk between signal lines 15a, 16, and 19, to which signals are sent, can be prevented.

On the other hand, in the case it is required to process S video signals by the signal processing apparatus, the signal cable 7 is connected to the external terminal 5. And the connection terminal detection means 8 detects the external terminal 7b, and the second switching element 3 becomes in a ON state. Thus, the control voltage supply terminal 20 is connected to the ground and the control voltage is not supplied to the transistor 2, and the transistor 2 is made into unconductive state.

Y signals inputted from the connection terminal 7a of the signal cable 7 are inputted to the Y/C processing circuit 11 via the signal line 15a, and C signals inputted from the connection terminal 7b of the signal cable 7 are inputted to the Y/C processing circuit 11 via the signal line 15b, wherein both signals are processed in the Y/C processing circuit.

Thus, when the signal cable 7 is connected to the signal processing apparatus, S video signals from the signal cable 7 can be inputted to the signal lines 15a and 15b and can be processed.

As explained heretofore, the signal processing apparatus according to the present invention detects an external terminal to which a signal cable is not connected and a connection terminal of the signal cable is not inserted, and a signal line connected to the detected external terminal is grounded. Thus, signal crosstalk can be prevented without providing a special grounded line for preventing signal crosstalk.

The above explanation is explained with an example such that a single crosstalk inhibition unit 10 is provided for a combination of the external terminal 5b and the signal line 15b. A signal crosstalk inhibition unit can be provided for other combination of an external terminal and a corresponding signal line and signal crosstalk inhibition units can be provided respectively. For example, the crosstalk inhibition unit 10 can be provided for the combination of the external terminal 5a and the signal line 15a and also for the combination of the external terminal 6 and the signal line 16.

In the case where the signal crosstalk inhibition unit 10 is provided for a plurality of external terminals and signal lines respectively, if such signal lines are not used for signal processing, more signal lines can be grounded and signal crosstalk can be prevented more surely. From this point of view, it is preferable that the signal crosstalk inhibition units 10 are provided for more external terminals and corresponding signal lines.

As for the second switching element 3, explanations were made employing a normal switch which is turned ON/OFF with a mechanical contact operation.

A semiconductor switching element can be applied as the second switching element. Namely, in the case where a semiconductor switching element is connected as a second switching element, the semiconductor switching element is made into conductive state to make the control voltage supply terminal 20 grounded and the transistor 2 is made into conductive state when the connection terminal detection means 8 detects a connection terminal. On the other hand, the semiconductor switching element is made into unconductive state and the transistor 2 is made into conductive state when the connection terminal detection means 8 does not detect a connection terminal.

In the above explanation, the transistor 2 is explained with an example of a NPN-typed transistor, but a PNP-typed transistor can be used.

Furthermore, as for the first switching element, a semiconductor switching element other than a transistor, such as a FET (Field Effect Transistor) can be connected. Namely, even when a semiconductor switching element other than a transistor is used as the first switching element, the path between an input terminal and an output terminal of the semiconductor switching element can be made conductive by inputting a control voltage to a control terminal of the semiconductor switching element, and a signal line connected to the input terminal of the semiconductor switching element can be connected to the ground to which the output terminal is connected of the semiconductor switching element.

Furthermore, as for the switching element, a normal switch that makes the path between one terminal connected to a signal line and the other terminal connected to the ground turn ON/OFF with a mechanical contact operation may be used other than the semiconductor switching element.

That is, the first switching element may be constituted of any means that does not make the signal line connect to the ground when the path between one terminal and the other terminal of it is made into unconductive state, and that makes the signal line connect to the ground when the path between one terminal and the other terminal of it is made into conductive state. However, using the semiconductor switching element as a first switching element is preferable, because the signal crosstalk inhibition unit can be made compact.

The example that the first switching element is made into unconductive state by making the second switching element into conductive state and the first switching element is made into conductive state by making the second switching element into unconductive state, is explained in the above explanation, but the second switching element may not be provided.

Namely, without providing such a second switching element, an arrangement can be made such that the first switching element becomes conductive when the connection terminal detection means detects a connection terminal, and that the first switching element becomes unconductive when the connection terminal detection means does not detect a connection terminal.

In the above explanation, an explanation is made with an example wherein signals are inputted from a signal cable to a signal line. However, the signal crosstalk inhibition unit according to the present invention can be applied in the case where signals are outputted from the signal line to the signal cable.

That is, in the case where signals are outputted from signal lines to signal cables, signal crosstalk between signal lines transmitting signals can be prevented by making a signal line not used for signal processing grounded with providing the signal crosstalk inhibition unit according to the present invention.

Furthermore, on providing the signal crosstalk inhibition unit according to the present invention, the signal processing apparatus may be provided with a signal line used both for a signal being inputting from a signal cable and for outputting a signal to the signal cable. Namely, the signal processing apparatus may be constituted such that a signal is inputted from the signal cable to the signal line in an input mode, and that a signal is outputted from the signal line to the signal cable in an output mode.

The signal processing apparatus with such a constitution as above-mentioned, by providing the signal crosstalk inhibition unit according to the present invention, can inhibit signal crosstalk between signal lines transmitting signals.

In the above explanation, an example of an apparatus for processing video signals including S video signals and composite signals is explained. However, the present invention is not limited to an apparatus for processing video signals. The present invention can be applicable to any kind of apparatus which is provided with a plurality of external terminals and signal lines and processes a plurality of signals As explained heretofore, according to the present invention, signal crosstalk between signal lines used for signal processing can be prevented by detecting an external terminal to which a signal cable is not connected and arranging that a signal line not used for signal processing is grounded.

Thus, according to the present invention, since there is no need to provide a special grounded line in order to prevent signal crosstalk, a signal processing apparatus can be made compact.

What is claimed is:

1. A signal crosstalk inhibition unit provided to a signal processing apparatus having a plurality of external terminals and signal lines connected to said external terminals, by connecting a signal cable to said signal processing apparatus with inserting a connection terminal of said signal cable into an external terminal, signal being inputted into a signal line and/or outputting signal from said signal line;

said signal crosstalk inhibition unit having a first switching element provided between said signal line and the ground, and a connection terminal detection means for detecting whether said connection terminal of said signal cable is connected to said external terminal of said signal processing apparatus or not, and said signal crosstalk inhibition unit making said first switching element into conductive state to connect said signal line to the ground, when said connection terminal detection means does not detect said connection terminal of said signal cable, and said signal crosstalk inhibition unit making said first switching element into unconductive state when said connection terminal detection means detects said connection terminal of said signal cable.

2. A signal crosstalk inhibition unit claimed in claim 1, wherein said first switching element is constituted of a first semiconductor switching element and said first semiconductor switching element is connected such that an input terminal of said first semiconductor switching element is connected to said signal line and an output terminal of said first semiconductor switching element is grounded and a path between said input terminal and said output terminal is made into conductive state in case of a control voltage being applied to a control terminal of said first semiconductor switching element and said path between said input terminal and said output terminal is made into unconductive state in case of said control voltage not being applied to said control terminal, and further having a second switching element that has one terminal and other terminal and that is connected such that said control voltage of said first semiconductor switching element is inputted to said one terminal of said second switching element and said other terminal of said second switching element is grounded, wherein said second switching element is connected such that said path between said one terminal and said other terminal of said second switching element becomes conductive in case said connection terminal detection means detects said connection terminal of said signal cable, and said path between said one terminal and said other terminal of said second switching element becomes unconductive in case said connection terminal detection means does not detect said connection terminal of said signal cable, and wherein in case said connection terminal detection means detects said connection terminal of said signal cable, said second switching element becomes conductive and said control voltage is lead to the ground, and said first semiconductor switching element becomes unconductive, and wherein in case said connection terminal detection means does not detect said connection terminal of said signal cable, said second switching element becomes unconductive and said first semiconductor switching element becomes conductive.

3. A signal crosstalk inhibition unit claimed in claim 2, wherein said connection terminal detection means is constituted such that whether said connection terminal of said signal cable is inserted to said external terminal of said signal processing apparatus or not is detected by a position of a detection element which is physically displaced between a first position and a second position, and wherein said second switching element becomes unconductive in case said connection terminal of said signal cable is not inserted to said external terminal of said signal processing apparatus and said detection element is placed at said first position, and wherein said second switching element becomes conductive in case said connection terminal of said signal cable is inserted to said external terminal of said signal processing apparatus and said detection element is placed at said second position.

4. A signal crosstalk inhibition unit claimed in claim 1, further including at least one transistor.

5. A signal processing apparatus having a plurality of external terminals and signal lines connected to said external terminals, by connecting a signal cable to said signal processing apparatus with inserting a connection terminal of said signal cable into an external terminal, signal being inputted into a signal line and/or outputting signal from said signal line;

said signal processing apparatus provided between said signal line and the ground that has a connection terminal detection means for detecting whether said connection terminal of said signal cable is inserted into said external terminal or not, and said signal crosstalk inhibition unit making a first switching element thereof into conductive state to connect said signal line to the ground, when said connection terminal detection means does not detect said connection terminal of said signal cable, and said signal crosstalk inhibition unit making said first switching element into unconductive state when said connection terminal detection means detects said connection terminal of said signal cable.

6. A signal processing apparatus claimed in claim 5, wherein said first switching element is constituted of a first semiconductor switching element and said first semiconductor switching element is connected such that an input terminal of said first semiconductor switching element is connected to said signal line and an output terminal of said first semiconductor switching element is grounded; and a path between said input terminal and said output terminal is made into conductive state in case of a control voltage being applied to a control terminal of said first semiconductor switching element; and said path between said input terminal and said output terminal is made into unconductive state in case of said control voltage not being applied to said control terminal, and further provided with a second switching element, which is provided in said signal crosstalk inhibition unit, having one terminal and other terminal and connected being such that said control voltage of said first semiconductor switching element is inputted to said one terminal of said second switching element and connected being such that said other terminal of said second switching element is grounded, and wherein said second switching element is connected such that said path between said one terminal and said other terminal of said second switching element becomes conductive in case said connection terminal detection means detects said connection terminal of said signal cable, and said path between said one terminal and said other terminal of said second switching element becomes unconductive in case said connection terminal detection means does not detect said connection terminal of said signal cable, and wherein in case said connection terminal detection means detects said connection terminal of said signal cable, said second switching element becomes conductive and said control voltage is lead to the ground, and said first semiconductor switching element becomes unconductive, and wherein in case said connection terminal detection means does not detect said connection terminal of said signal cable, said second switching element becomes unconductive and said first semiconductor switching element becomes conductive.

7. A signal processing apparatus claimed in claim 6, wherein said connection terminal detection means is constituted such that whether said connection terminal of said signal cable is inserted to said external terminal of said signal processing apparatus or not is detected by a position of a detection element which is physically displaced between a first position and a second position, and wherein said second switching element becomes unconductive in case said connection terminal of said signal cable is not inserted to said external terminal of said signal processing apparatus and said detection element is placed at said first position, and wherein said second switching element becomes conductive in case said connection terminal of said signal cable is inserted to said external terminal of said signal processing apparatus and said detection element is placed at said second position.

8. A signal processing apparatus claimed in claim 5, wherein said crosstalk inhibition units are disposed for a plurality of external terminals and signal lines connected to said external terminal.

9. A signal processing apparatus claimed in claim 6, wherein said crosstalk inhibition units are disposed for a plurality of external terminals and signal lines connected to said external terminal.

10. A signal processing apparatus claimed in claim 7, wherein said crosstalk inhibition units are disposed for a plurality of external terminals and signal lines connected to said external terminal.

11. A signal processing apparatus claimed in claim 5, wherein said signal crosstalk inhibition unit includes at least one transistor.

* * * * *